United States Patent [19]

Yoshiura et al.

[11] 3,904,565

[45] Sept. 9, 1975

[54] POLYOLEFIN COMPOSITION

[75] Inventors: Hirohisa Yoshiura; Toshiharu Arai; Masao Miyake; Tsunemi Yoshioka; Tetsushi Kamizono; Seiji Onogi, all of Kurashiki, Japan

[73] Assignee: Mitsubishi Chemical Industries Ltd., Tokyo, Japan

[22] Filed: Nov. 29, 1973

[21] Appl. No.: 420,170

[30] Foreign Application Priority Data

Dec. 1, 1972   Japan............................ 47-120471

[52] U.S. Cl......... 260/23 H; 206/45.34; 260/45.7 P; 260/45.8 P; 260/45.95 C
[51] Int. Cl. .............................................. C08f 19/14
[58] Field of Search ...... 260/23 H, 45.95 C, 45.7 P, 260/45.8 P; 206/45.34

[56] References Cited

UNITED STATES PATENTS

| | | | |
|---|---|---|---|
| 3,048,266 | 8/1962 | Hackhel | 206/45.34 |
| 3,476,698 | 11/1969 | Osterrieth | 260/23 H |
| 3,549,587 | 12/1970 | Nicholson | 260/45.8 |

*Primary Examiner*—Melvyn I. Marquis
*Assistant Examiner*—William Parker
*Attorney, Agent, or Firm*—Oblon, Fisher, Spivak, McClelland & Maier

[57] ABSTRACT

A thiobisphenol, an organic phosphite, a metal salt of a higher fatty acid and a polyalkyleneglycol ether are combined with a polyolefin containing a polymerization catalyst, whereby the antioxidation, light-fastness and hue of the polyolefin composition are improved.

8 Claims, No Drawings

POLYOLEFIN COMPOSITION

BACKGROUND OF THE INVENTION

1. Field of the Invention

This invention relates to polyolefin compositions containing a polymerization catalyst which has improved antioxidation, light-fastness and hue.

2. Description of the Prior Art

Polyolefins are conventionally prepared by polymerization reactions employing such conventional polymerization catalysts as Ziegler and Phillips Catalysts. However, in the preparation of these polyolefins, especially high density polyethylene, it is necessary to separate the residue polymerization catalysts by treating the catalyst residue containing polyolefin with an alcohol, water or by filtration in order to obtain a polyolefin with a desired combination of properties.

For example, polyolefins exhibiting high antioxidation properties and good light-fastness are conventionally prepared by adding a phenol type antioxidant and an organic phosphite. However, these compositions have a disadvantageously low W value of Hunter whiteness that is noticeable as a disadvantageous hue when compared to that of a polyolefin which has no additives. However, without the additives the polyolefin does not have sufficient antioxidative and light-fastness properties.

The undesirable hue is believed to be the result of a coloring of the polyolefin by the hue of the organic phosphite and/or by an interaction of the residual catalyst and the phenol type antioxidant. In fact, the coloring, and therefore the undesirable hue, is great when a polyolefin containing a residual polymerization catalyst is used with these additives.

As noted above, the residue of polymerization catalyst is conventionally separated from the polyolefin by treatment with an alcohol, water or filtration. However, this separation step is undesirable because of the expense of removal and much attention has been directed to eliminating this separation step. One solution has been proposed which eliminates the separating of the residual polymerization catalyst by decreasing the quantity of catalyst used in the polymerization by employing a very active catalyst. However, this approach has not been entirely satisfactory.

Therefore, a need continues to exist for a polyolefin which has improved antioxidation, light-fastness and hue without requiring the separation of the residual polymerization catalyst.

SUMMARY OF THE INVENTION

Accordingly, one object of this invention is to eliminate the necessity of separating the residual polymerization catalyst from the polyolefin.

Another object of this invention is to provide a polyolefin composition having high antioxidation properties, high light-fastness and at the same time an improved hue.

Yet another object of this invention is to provide a high density polyethylene composition having high antioxidation properties, high light-fastness and at the same time, an improved hue.

Briefly, these and other objects of the invention as hereinafter will become apparent are achieved by providing a polyolefin composition, especially a high density polyethylene composition, comprising 0.001 – 1.0 wt % of (a) a thiobisphenol having the formula:

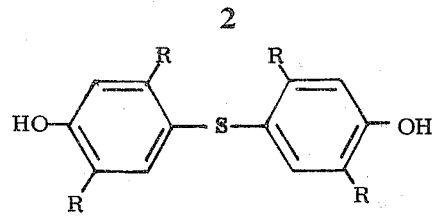

wherein R is the same or different and represents hydrogen atom, an alkyl group of a cyclic hydrocarbon group;

0.01 14 2.00 wt % of (b) an organic phosphite having the formula:

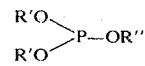

wherein R' and R'' are the same or different and represent respectively an alkyl group, a cycloalkyl group, an aryl group, or aralkyl group; 0.01 –2.00 wt % of (c) a metal salt of higher fatty acid and 0.01 14 0.50 wt % of a polyalkyleneglycol ether. The wt % is based on the weight of the polyolefin.

DETAILED DESCRIPTION OF THE PREFERRED EMBODIMENTS

The polyolefin used for this invention may be any polyolefin including homopolymers such as polyethylene, polypropylene, polybutene-1, poly-4-methylpentene-1, copolymers such as ethylene-propylene or the like, which has not been treated to separate the polymerization catalyst. The invention is especially effective for high density polyethylene containing a residual polymerization catalyst.

In the invention, the polyolefin, especially high density polyethylene which is not treated to separate the residual catalyst, includes polyolefins prepared from a polyolefin solution or a slurry resulting from the polymerization reaction without separating the residual catalyst. The treatment or separation of the residual catalyst is usually done by a mechanical separation such as a filtration of the polyolefin solution or by a chemical separation on transfer of most of the catalyst from the solution or slurry by treating with a large amount of water or alcohol. This invention eliminates these costly separations. This separation which is conventionally required and eliminated by this invention, is to be distinguished from the inhibition of a polymerization reaction by adding a catalyst poison such as a small amount of ether, alcohol, ketone, ester, or the like to a slurry or solution of the polyolefin or the step of separating a medium from a slurry of polyolefin by filtration or a centrifugal separation or a step of separating a medium from a solution or slurry of polyolefin by steam stripping propylene or butene-1.

The invention is preferably applied to high density polyethylene or a copolymer of ethylene and an α-olefin prepared by using conventional Ziegler catalysts or the conventional Phillips catalysts. More than 10,000 and preferably more than 20,000 of the convention level of the polymer per unit of the catalyst is used.

The conventional Ziegler catalysts may be a combination of an organo metal compound, the metal selected from the metals of Groups 1–3 of the Periodic Table and one or more transition metals selected from the metals of Groups 4–6 of the Periodic Table, e.g., Ti, V, Zr, or Cr. The typical Ziegler catalyst is a combination of an organoaluminum compound and a reaction product of a transition metal compound, e.g., titanium tetrachloride and a divalent metal hydroxyhalide or the like.

The Phillips catalyst may be chromium oxide supported by a heat resistant metal oxide support such as silica, alumina or silica-alumina and/or a combination of chromium oxide and an organoaluminum compound. These conventional catalysts, i.e., Ziegler and Phillips, remain in the polyolefins after the polymerization reaction. This is especially true with respect to high density polyethylene.

The thiobisphenols having the formula:

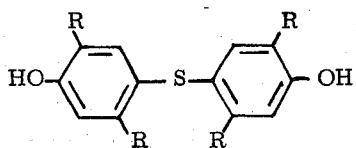

wherein R is the same or different and represents hydrogen or an alkyl ($C_{1-18}$) group or a cyclic hydrocarbon group, used as the component ($a$) of this invention include 4,4'-thiobis(3-methyl-6-t-butylphenol); 4,4'-thiobis(3,6-dimethylphenol); 4,4'-thiobis(3,6-di-t-butylphenol); 4,4'-thiobis(3-ethyl-6-t-butylphenol); 4,4'-thiobis(3-n-propyl-6-aminophenol); 4,4'-thiobis(3-methyl-6-n-octylphenol); 4,4'-thiobis(3-amyl-6-t-octylphenol); 4,4'-thiobis (3-methyl-6-n-decylphenol); 4,4'-thiobis(3-methyl-6-laurylphenol); 4,4'-thiobis(3,6'-dilaurylphenol); 4,4'-thiobis [3-methyl-6-(1-methylbenzyl) phenol]; or the like. It is especially preferable to use 4,4'-thiobis(3-methyl-6-t-butylphenol), hereinafter referred to at TBMBP.

The organo phosphites having the formula:

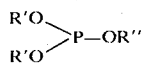

wherein R' and R'' are same or different and represent $C_{1-18}$ alkyl group, a cycloalkyl group, an aryl group or an aralkyl group used as component ($b$) in the invention include tri(2-ethylhexyl) phosphite, tri(p-isopropyl-phenyl) phosphite, tri(p-t-butyl-phenyl) phosphite, di(p-t-butyl-phenyl) monophenyl phosphite, tri-(n-octyl) phosphite, n-nonylphosphite, tri(nonylphenyl) phosphite, tristearyl phosphite, or the like. It is especially preferable to use tris(mono-and di-nonylphenyl) phosphite.

The metal salt of a higher fatty acid used as component ($c$) in the invention includes metal salts wherein the metal is selected from Groups 1–4 of the Periodic Table (preferably Mg, Ca, Ba and Zn) of stearic acid, palmitic acid, oleic acid and ricinoleic acid such as the lithium, calcium, barium, cadmium, lead salts or the like. It is especially preferable to use calcium stearate.

The polyalkylene glycol ethers used as component ($d$) in the invention include polyoxyethylene alkyl ethers such as polyoxyethylene alkylphenol ethers such as polyoxyethylene octylphenol, nonylphenol or dodecylphenol ethers which have a HLB of higher than 3; polyoxyethylene polyoxypropylene ethers which have a HLB of higher than 5; polyoxyethylene sorbitan alkylates, e.g., polyoxyethylene sorbitan laurate, myristate, palmitate or stearate which have HLB values higher than 5. It is especially preferably to use polyoxyethylene oleyl ether or polyoxyethylene nonylphenol ether having a HLB value of from 3–20.

The amount of additives ($a$), ($b$), ($c$) and ($d$) added may vary over wide limits depending upon the properties desired for the polyolefin. The thiobisphenol ($a$) is usually used in an amount of from 0.001 to 1.0, preferably from about 0.001 to 0.05, and most preferably from 0.005 to 0.02 wt %. The organophosphite ($b$) is used in an amount of from about 0.01 to 2.00, perferably 0.01 to 0.50, and most preferably from 0.02 to 0.30 wt %. The metal salt of a higher fatty acid ($c$) is usually used in an amount of from 0.01 to 2.00, preferably from about 0.01 to 0.50 and most preferably from 0.02 to 0.30 wt %. The amount of polyalkyleneglycol ether ($d$) used is usually from about 0.01 to 0.5, preferably from 0.01 to 0.1, and most preferably from 0.01 to 0.5 wt %.

The method of blending the additives ($a$), ($b$), ($c$) and ($d$) with the polyolefin, especially the high density polyethylene is not limited and can be done in the conventional manner.

In accordance with this invention, a polyolefin composition, especially a high density polyethylene composition having improved antioxidation, light-fastness and hue can be obtained without the necessity of separating the residual catalyst from the polyolefin. The elimination of the necessity of separating the residual catalyst from the polyolefin is very advantageous in an industrial process since it eliminates the expense of this step. Moreover, the value of the polyolefin composition, especially high density polyethylene, is increased.

Having generally described the invention, a more complete understanding can be obtained by reference to certain specific examples, which are included for purposes of illustration only and are not intended to be limiting unless otherwise specified.

EXAMPLES 1–7 AND REFERENCES 1–9

High density polyethylene was prepared by using a conventional Ziegler catalyst without separating the residual catalyst from the polyethylene. 4,4'-Thiobis(3-methyl-6-t-butylphenol) (TBMBT), tris(mono-and di-nonylphenyl) phosphite (Mark 329), calcium stearate, polyoxyethylene nonylphenyl ether (average ethyleneoxide 9 moles adduct) and polyoxyethylene oleyl ether (average ethyleneoxide 14 moles adduct) were added in the amounts shown in the Table 1. As references, high density polyethylene itself, or polyethylene compositions which contain one or more of the four additives ($a$), ($b$), ($c$) and ($d$) are used.

The polyethylene and the additives were pelletized by extruding them at a resin temperature of 250°–270°C from an extruder.

The antioxidation, light-fastness, hue and color change of the sample pellets were evaluated by the following test methods.

Antioxidation 10 g of each of the sample pellets was put in a pot made of aluminum and it was heated at 220°C in air for 40 minutes. After cooling, the hue of the surface and the deterioration product of the sample were observed.

Hue

A disc of the composition was prepared by a small size injection molding machine (one-half ounce) at 260°C for 8 minutes of residual time. The hue of the disc sample was measured by the Color-And-Color-Difference Meter (Type-ND-K5) and it was evaluated by Hunter whiteness.

Color Change

The thus prepared disc sample was irradiated by a carbon arc weather-o-meter at a black panel temperature of 63°C in an atmosphere having a relative humidity of 75% for 100 hours. The color change of the disc samples were evaluated.

EXAMPLES 8–13

The process of Examples 1–7 was followed except that the type and quantity of the additives as shown in Table 2 was used. The results are shown in Table 2.

EXAMPLE 14

The process of Examples 1–7 was followed except that polypropylene having average molecular weight of 200,000 was used instead of the polyethylene. The same results were obtained.

It is apparent from the results of the experiments shown in Table 1 that the high density polyethylene composition containing TBMBP and tris(mono- and di-nonylphenyl) phosphite (Mark 329) has good antioxidation properties but a bad hue. On the other hand, the polyethylene composition containing the four components of this invention had excellent improved antioxidation, light-fastness and hue.

TABLE 1

| | Amount of additives (weight percent with respect to the polyethylene) | | | | | Antioxidation | | Hue Hunter Whiteness | | | | Color change (weather meter irradiation time 100 hr.) Hunter Whiteness | | | |
|---|---|---|---|---|---|---|---|---|---|---|---|---|---|---|---|
| | TBMBP | tris(mono- and di-nonyl-phenyl phosphate Mark 329 | Ca stearate | Polyoxy-ethylene oleyl ether (HLB 14) | Polyoxy-ethylene nonyl-phenyl-ether (HLB 13.2) | Color-ing | Surface Deteri-oration | L | a | b | w | L | a | b | w |
| Refer. | | | | | | | | | | | | | | | |
| 1 | — | — | — | — | — | color | deteri-oration | 78.6 | −1.4 | 2.0 | 78.4 | 78.3 | −1.6 | 2.2 | 78.1 |
| 2 | 0.005 | 0.10 | — | — | — | none | none | 78.1 | −2.3 | 2.6 | 77.8 | 77.5 | −3.0 | 3.9 | 77.0 |
| 3 | " | 0.30 | 0.30 | — | — | " | " | 78.3 | −2.2 | 2.4 | 78.1 | 77.9 | −2.9 | 3.7 | 77.4 |
| 4 | " | " | — | 0.03 | — | " | " | 78.2 | −2.2 | 2.5 | 78.0 | 77.7 | −2.7 | 3.6 | 77.2 |
| 5 | 0.02 | 0.10 | — | — | — | " | " | 78.0 | −2.0 | 2.7 | 77.7 | 76.7 | −2.3 | 5.3 | 76.0 |
| 6 | " | 0.30 | — | — | — | " | " | 77.6 | −2.3 | 3.4 | 77.2 | 76.2 | −2.7 | 5.7 | 75.4 |
| 7 | " | " | 0.30 | — | — | " | " | 77.8 | −2.5 | 3.2 | 77.4 | 76.0 | −2.8 | 5.5 | 75.2 |
| 8 | " | " | — | 0.03 | — | " | " | 77.9 | −2.6 | 3.0 | 77.5 | 76.3 | −2.9 | 5.6 | 75.5 |
| 9 | " | " | — | — | 0.03 | " | " | 78.1 | −2.3 | 2.7 | 77.8 | 76.6 | −2.6 | 5.3 | 75.8 |
| Sample | | | | | | | | | | | | | | | |
| 1 | 0.005 | 0.10 | 0.05 | 0.03 | 0.03 | " | " | 79.7 | −1.6 | 2.0 | 79.5 | 79.5 | −1.7 | 2.3 | 79.3 |
| 2 | " | " | " | — | — | " | " | 79.9 | −1.5 | 1.8 | 79.7 | 79.7 | −1.6 | 2.1 | 79.5 |
| 3 | " | " | 0.30 | " | — | " | " | 79.4 | −1.8 | 2.1 | 79.2 | 79.3 | −1.9 | 2.4 | 79.1 |
| 4 | " | 0.30 | " | — | — | " | " | 79.2 | −1.9 | 2.2 | 79.0 | 79.0 | −2.0 | 2.5 | 78.8 |
| 5 | 0.02 | 0.10 | 0.30 | 0.03 | — | " | " | 79.0 | −2.0 | 2.0 | 78.8 | 78.9 | −2.2 | 2.1 | 78.7 |
| 6 | " | 0.30 | " | " | — | " | " | 78.9 | −2.0 | 2.2 | 78.7 | 78.7 | −2.0 | 2.6 | 78.4 |
| 7 | " | " | " | — | 0.03 | " | " | 79.5 | −1.8 | 2.0 | 79.3 | 79.3 | −1.9 | 2.4 | 79.1 |

TABLE 2

| | Additives and Amount of additives (weight percent with respect to the polyethylene) | | | | Antioxidation | | Hue Hunter Whiteness | | | | Color change (weather meter irradiation time 100 hr) Hunter Whiteness | | | |
|---|---|---|---|---|---|---|---|---|---|---|---|---|---|---|
| | thiobis-phenol | organic phosphite | metallic salt of a higher fatty acid | polyoxy-ethylene oleyl ether (HLB 14) | Color-ing | Surface Deteri-oration | L | a | b | w | L | a | b | w |
| Ex. | TBMBP | TNP** | Ca-stearate | | | | | | | | | | | |
| 8 | 0.005 | 0.10 | 0.05 | 0.03 | none | none | 79.4 | −1.8 | 2.1 | 79.2 | 79.1 | −2.0 | 2.6 | 78.8 |
| 9 | 0.005 | 0.30 | 0.30 | 0.03 | " | " | 79.2 | −2.0 | 2.5 | 78.9 | 78.9 | −2.0 | 3.0 | 78.6 |
| | TBMPB | Mark 329 | Zn-stearate | | | | | | | | | | | |
| 10 | 0.005 | 0.10 | 0.05 | 0.03 | " | " | 79.8 | −.15 | 1.9 | 79.6 | 79.6 | −1.6 | 2.2 | 79.4 |
| 11 | 0.02 | 0.10 | 0.30 | 0.03 | " | " | 79.1 | −2.0 | 2.1 | 78.9 | 78.8 | −2.1 | 3.5 | 78.4 |
| | *'TBDTBP | Mark 329 | Ca-stearate | | | | | | | | | | | |
| 12 | 0.005 | 0.10 | 0.05 | 0.03 | " | " | 79.7 | −1.6 | 1.9 | 79.5 | 79.5 | −1.8 | 2.5 | 79.3 |
| 13 | 0.02 | 0.10 | 0.30 | 0.03 | " | " | 79.0 | −2.1 | 2.2 | 78.8 | 78.8 | −2.3 | 3.6 | 78.3 |

*'4,4'-thiobis(3,6-di-t-butylphenol)
*²tri(nonylphenyl)phosphite

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A polyolefin composition containing a residual polymerization catalyst; from 0.001 – 1.0% by weight of a thiobisphenol having a formula

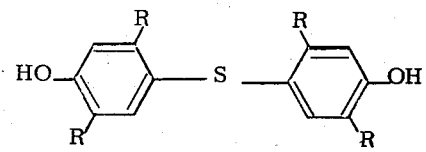

wherein R is the same or different and represents a hydrogen atom, an alkyl or cyclic hydrocarbon group; 0.01 – 2.0% by weight of an organic phosphite having a formula

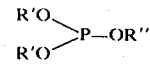

wherein R' and R'' are the same or different and represent an alkyl group, a cycloalkyl group, an aryl group or aralkyl group; 0.01 –2.0% by weight of a metal salt of a higher fatty acid; and 0.01 – 0.5% by weight of a polyalkyleneglycol alkyl ether.

2. The composition of claim 1, wherein the polyolefin is a high density polyethylene.

3. The polyolefin composition of claim 1, wherein the polyalkyleneglycol ether is a polyethyleneglycol alkyl ether having an HLB value higher than 3.

4. The polyolefin composition of claim 3, wherein the polyethyleneglycol ether having a HLB value higher than 3 is selected from the group consisting of polyoxyethylene lauryl, myristyl, palmityl, stearyl or oleyl ether, polyoxyethylene octylphenol, nonylphenol or dodecylphenol ether, polyoxyethylene polyoxypropylene ether, and polyoxyethylene sorbitan laurate myristate, palmitate or stearate.

5. The polyolefin composition of claim 1, wherein the metal salt of higher fatty acid is a metal salt of stearic acid, palmitic acid, oleic acid, or ricinoleic acid.

6. The high density polyethylene composition of claim 2, wherein the residual polymerization catalyst is a Ziegler catalyst, a catalyst of chromium oxide supported on a heat resistant metal oxide or said supported chromium oxide catalyst in combination with an organo-aluminum compound, the thiobisphenol is 4,4'-thiobis(3-methyl-6-t-butylphenol) and the organic phosphite is tris (mono- or di-nonylphenyl) phosphite.

7. The high density polyethylene composition of claim 6, wherein the salt of a higher fatty acid is calcium stearate and the polyalkylene glycol alkyl ether is, polyoxyethylene oleyl ether or polyoxyethylene nonylphenyl ether having a HLB value of 3 – 20.

8. The polyolefin composition of claim 5, wherein the metal of the metal salt is selected from the metals of Groups I to IV of the Periodic Table.

* * * * *